United States Patent [19]

Tohyama et al.

[11] Patent Number: 5,229,896
[45] Date of Patent: Jul. 20, 1993

[54] DISK DRIVE AND METHOD OF CONTROLLING THE SAME

[75] Inventors: Souichi Tohyama, Ibaraki; Hiromu Hirai, Tsukuba; Haruaki Otsuki, Toride; Yoosuke Hamada, Ibaraki, all of Japan

[73] Assignee: Hitachi, Ltd., Tokyo, Japan

[21] Appl. No.: 780,783

[22] Filed: Oct. 23, 1991

[30] Foreign Application Priority Data

Oct. 23, 1990 [JP] Japan .................................. 2-285648

[51] Int. Cl.⁵ .................................................. G11B 5/596
[52] U.S. Cl. ............................... 360/78.07; 360/78.04
[58] Field of Search ................... 360/78.07, 78.04, 75, 360/77.02, 77.04–77.07, 78.06, 78.11, 78.14

[56] References Cited

U.S. PATENT DOCUMENTS

| | | | |
|---|---|---|---|
| 4,636,883 | 1/1987 | Hashimoto | 360/78.07 |
| 4,954,907 | 9/1990 | Takita | 360/78.07 |
| 4,965,501 | 10/1990 | Hashimoto | 360/78.07 |

Primary Examiner—Edward P. Westin
Assistant Examiner—T. Davenport
Attorney, Agent, or Firm—Antonelli, Terry Stout & Kraus

[57] ABSTRACT

A disk drive has a data recording medium disk, a head disposed facing a recording surface of the disk, for reading and writing data, a positioning mechanism for supporting and moving the head, a position detector for detecting the position of the head and outputting a position detection signal, and a control unit for processing the position detection signal and outputting a position control signal to the positioning mechanism. The control unit calculates a target acceleration signal for a given target track so as to make a turnaround frequency of a frequency component of the target acceleration signal coincident with a resonance frequency of the head positioning mechanism, calculates a target position for a head positioning operation in accordance with the target acceleration signal, calculates a position command value by inputting the target position signal to a model (inverse model) of an approximate inverse system to a position control system which includes the head positioning mechanism and the position detector, and outputs a position tracking error to the positioning mechanism, the position tracking error being the difference between the position command value and the position detection signal of the head.

21 Claims, 14 Drawing Sheets

DISK DRIVE AND METHOD OF CONTROLLING THE SAME

CROSS-REFERENCE TO OTHER APPLICATION

Reference is made to commonly assigned copending U.S. patent application Ser. No. 07/682262, entitled METHOD AND APPARATUS FOR CONTROL OF POSITIONING, and filed on Apr. 8, 1991.

BACKGROUND OF THE INVENTION

The present invention relates to a disk drive and a method of controlling a disk drive, and more particularly to a head positioning mechanism for a disk drive and a method of controlling the disk drive.

Disk drives, particularly magnetic disk drives, are widely used by computers to access disks as external information storage medium providing a large storage capacity.

Generally, a magnetic disk drive system has as its main components, a plurality of storage medium disks concentrically and rotatably supported, a plurality of heads facing each disk surface, a head positioning mechanism for supporting each head and moving it to a target track, and a controller for controlling the operation of the head positioning mechanism.

In most of the methods applied to positioning a head, the head position is controlled by using a velocity control and a position control alternately. Specifically, first a head is moved near to a target track at a high velocity under control of a speed feedback control system which gives a velocity command corresponding to the number of tracks from the present head position to a target track and makes the head move at given speed. Then the velocity feedback control system is switched to a position feedback control system by which the head is finely positioned at the center of the target track.

In a related apparatus disclosed in JP-A-2-56008, there is proposed a magnetic disk drive having a position control system which includes a head positioning mechanism (a controlled object), a compensator, and a head position detector, wherein a filter is serially connected to the position control system at the front stage thereof, the filter having an inverse characteristic of the control system dynamics in order to obtain a desired output response having a transfer function of one for a signal path from the filter input to the control system output.

The following problems have been found in the above-described position control systems for magnetic disks.

(1) In most of the conventional methods whereby speed control is switched to position control, a single type of speed command is used over an operation range from a short to a long head seek distance. In such a case, particularly in the case of a short head seek distance, it is difficult for an actuator to generate a large output, and so to move the head at a sufficiently high speed.

(2) In the conventional method of switching between the control systems, acceleration of the controlled object changes rapidly at the switching point, so that a head and head positioning mechanism are mechanically vibrated, thereby requiring a long head position alignment time.

(3) In order to provide a filter having an inverse characteristic of a head positioning system, it becomes necessary to prepare a model of a controlled object. However, the head positioning mechanism to be controlled has in many cases complicated vibration modes, so that a precise model cannot be obtained. Thus, the transfer function is not one at the signal path from the input of the filter having the inverse dynamic characteristic to the output of the control system. If an input is designed without considering such a transfer function, the resonance point of a head positioning mechanism is excited, resulting in a long head seek time.

SUMMARY OF THE INVENTION

It is an object of the present invention to provide a disk drive capable of suppressing head vibrations and allowing high speed positioning operations, without greatly changing the basic control system configuration.

Namely, according to the present invention, target values (target position, target velocity, target acceleration) of a positioning operation are preset so as to suppress resonances of a head positioning mechanism, the target values are inputted to an inverse model, and the outputs of the inverse model are used as command signals to respective control systems. It is therefore an object of the present invention to prevent vibrations of a head during its operation, to cancel an operation time delay inherent to each control system, and to move the head to the center of a target track at a high speed.

In order to achieve the above objects of the present invention, a disk drive system comprises:

a data recording medium disk;

a head disposed facing a recording surface of the disk, for reading and writing data;

a positioning mechanism for supporting and moving the head;

means for detecting the position of the head and outputting a position detection signal; and control means for processing the position detection signal and outputting a position control signal to the positioning mechanism, the control means having, means for calculating a target acceleration signal for a given target track so as to make a turnaround frequency of the target acceleration signal equal to a resonance frequency of the head positioning mechanism, means for calculating a target position for a head positioning operation in accordance with the target acceleration signal, means for calculating a position command value by inputting the target position signal to a model (inverse model) of an approximate inverse system to a position control system which includes the head positioning mechanism and the position signal detecting means, and means for outputting a Position tracking error signal to the positioning mechanism, the position tracking error being the difference between a result calculated by the position command value calculating means and the position detection signal of the head.

Another disk drive system of the present invention comprises:

a data recording medium disk;

a head disposed facing a recording surface of the disk, for reading and writing data;

a positioning mechanism for supporting and moving the head;

means for detecting the speed of the head and outputting a speed detection signal; and control means for processing the speed detection signal and outputting a speed control signal to the positioning mechanism, the control means having, means for calculating a target acceleration signal for a given target track so as to make a turn-around frequency of the target acceleration signal equal to a resonance frequency of the head positioning mechanism, means for calculating a target velocity for a head positioning operation in accordance with the target acceleration signal;

means for calculating a velocity command value by inputting the target velocity signal to a model (inverse model) of an approximate inverse system to a velocity control system which includes the head positioning mechanism and the speed signal detecting means, and means for outputting a velocity tracking error signal to the positioning mechanism, the velocity tracking error being the difference between a result calculated by the velocity command value calculating means and the speed detection signal of the head.

Another disk drive system in accordance with the invention comprises:

a data recording medium disk;

a head disposed facing a recording surface of the disk, for reading and writing data;

a positioning mechanism for supporting and moving the head;

means for detecting the position of the head and outputting a position detection signal; and control means for processing the position detection signal and outputting a position control signal to the positioning mechanism, the control means having, means for calculating a target acceleration signal for a given target track so as to make a turnaround frequency of the target acceleration signal equal to a resonance frequency of the head positioning mechanism, means for calculating a target position for a head positioning operation in accordance with the target acceleration signal, means for calculating a first command value by multiplying the target position signal by the gain of the head position detecting means, means for outputting a position tracking error signal which is the difference between the first command value and the head position detecting signal, means for calculating a second command value signal by inputting the target position signal to a model (inverse model) having an approximate, inverse transfer function of the head positioning mechanism, and means for outputting the position control signal obtained by adding the second command value signal to an output of the position tracking error outputting means.

In order to achieve the above objects of the present invention, a method of controlling a disk drive, comprises the steps of:

reading information of the position of a target track;

reading a position detection signal detected by a head position detector;

calculating a target acceleration signal in accordance with the information and the position detection signal so as to make a turnaround frequency of the target acceleration signal equal to a resonance frequency of a head positioning mechanism;

calculating a target position signal for a head positioning operation by integrating twice the target acceleration signal;

calculating a position command value by inputting the target position signal to a model (inverse model) of an approximate inverse system to a position control system which includes the head positioning mechanism and the position detector;

outputting a position tracking error signal to the positioning mechanism, the position tracking error signal being the difference between the position command value and the position detection signal of the head; and moving the head by the positioning mechanism in response to the position tracking error signal.

Most of the presently available disk drive systems execute a head positioning operation by alternately selecting a velocity control system and a position control system. The velocity control system operates to move a head near to a target position at a high speed, and the position control system operates to precisely position the head at the target position. According to the present invention, the positioning operation command value calculating means calculates a command value by canceling an operation time delay of the velocity control system or position control system and by suppressing vibrations of the head positioning mechanism. The head position control is carried out using the command value so that the head positioning operation can be speeded up and vibrations of the head positioning mechanism can be avoided.

BRIEF DESCRIPTION OF THE DRAWINGS

These and other objects and advantages of the present invention will become apparent by reference to the following description and accompanying drawings, wherein.

DESCRIPTION OF THE PREFERRED EMBODIMENTS

Embodiments of a magnetic disk drive system and a method of controlling a magnetic disk drive in accordance with the present invention will be described in detail, the embodiments, incorporating a head position control system according to the present invention.

Figure 1:
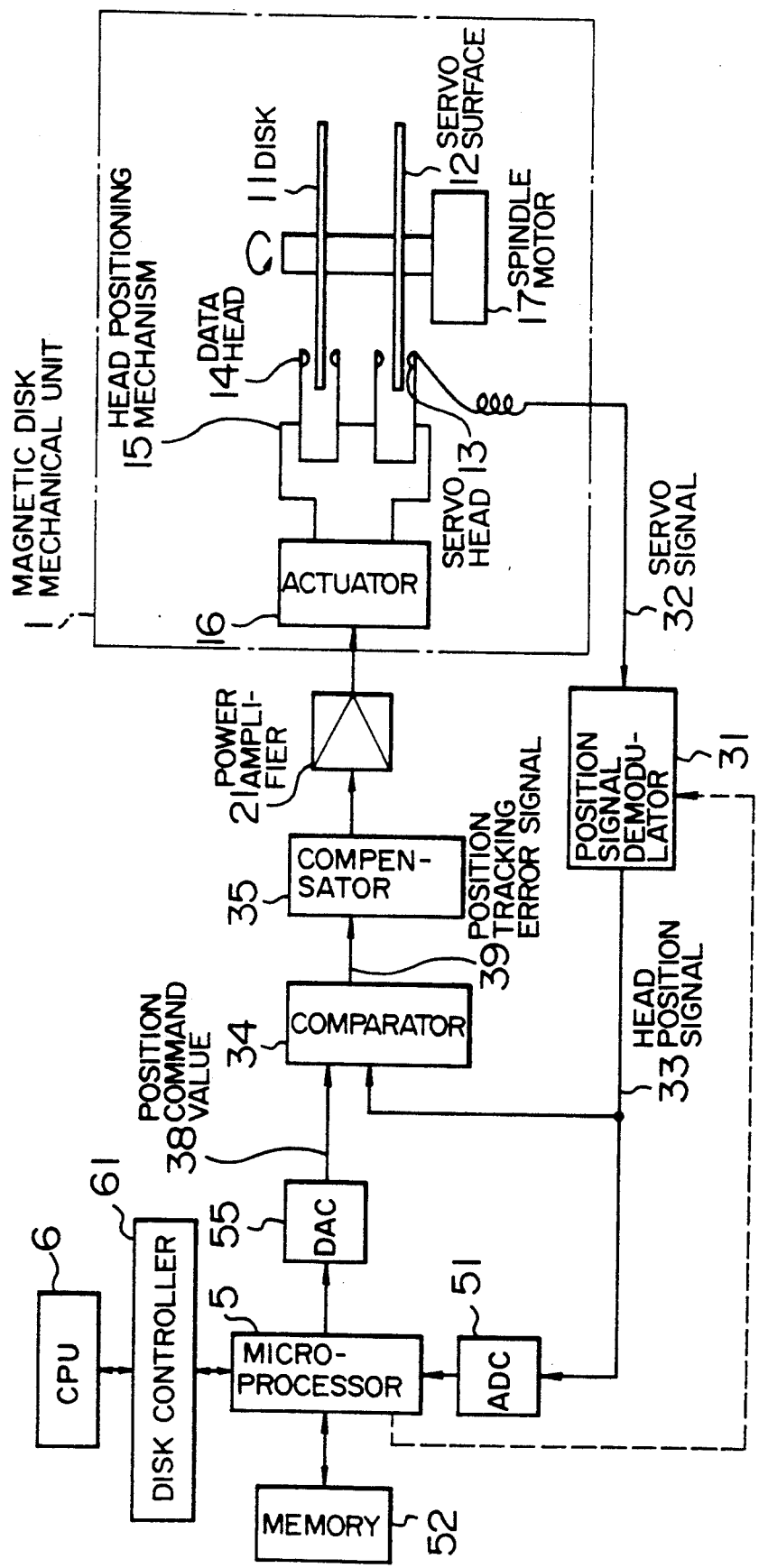
FIG. 1 is a block diagram showing a first embodiment of a disk drive according to the present invention.

FIG. 1 is a block diagram showing an embodiment of a magnetic disk drive system incorporating the head position control system of the present invention. In this embodiment, a head is moved to a target position rapidly and stably using position control.

A magnetic disk drive mechanical unit 1 has disks 11 mounted on a shaft which is rotated by a spindle motor 17, heads each including a servo head 13 and data head 14 for reading/writing information relative to the disks, a head positioning mechanism 15 which supports the heads, and an actuator 16 for driving the head positioning mechanism 15.

This embodiment adopts a so-called dedicated servo method whereby the servo head 13 reads a servo signal 32 from a servo surface 13 to detect and control the present position of the data heads 14. A position signal demodulator 31 receives the servo signal 32 and outputs a head position signal 33 which is in proportion to a position tracking error of the head.

When a central processing unit CPU 6 instructs a disk controller 61 to input data to, or output data from, a magnetic disk, a microprocessor 5 calculates a position command value 38 used for a head positioning operation and outputs it via a digital/analog converter (DAC) 55. The microprocessor 5 receives the head position signal 33 via an analog/digital converter (ADC) 51. A memory 52 stores therein programs for the microprocessor 5 and other constants necessary for calculation. The details of calculations by the microprocessor 5 will be described later.

A comparator 34 subtracts head position signal 33 from the position command value 38 to output a position tracking error signal 39. A compensator 35 receives the position tracking error signal 39 and outputs a control signal to a power amplifier 21, the control signal being used for stabilizing the control system and suppressing the effects of mechanical vibrations and external disturbances. The power amplifier 21 receiving this control signal supplies electric energy to the actuator 16.

Figure 2:
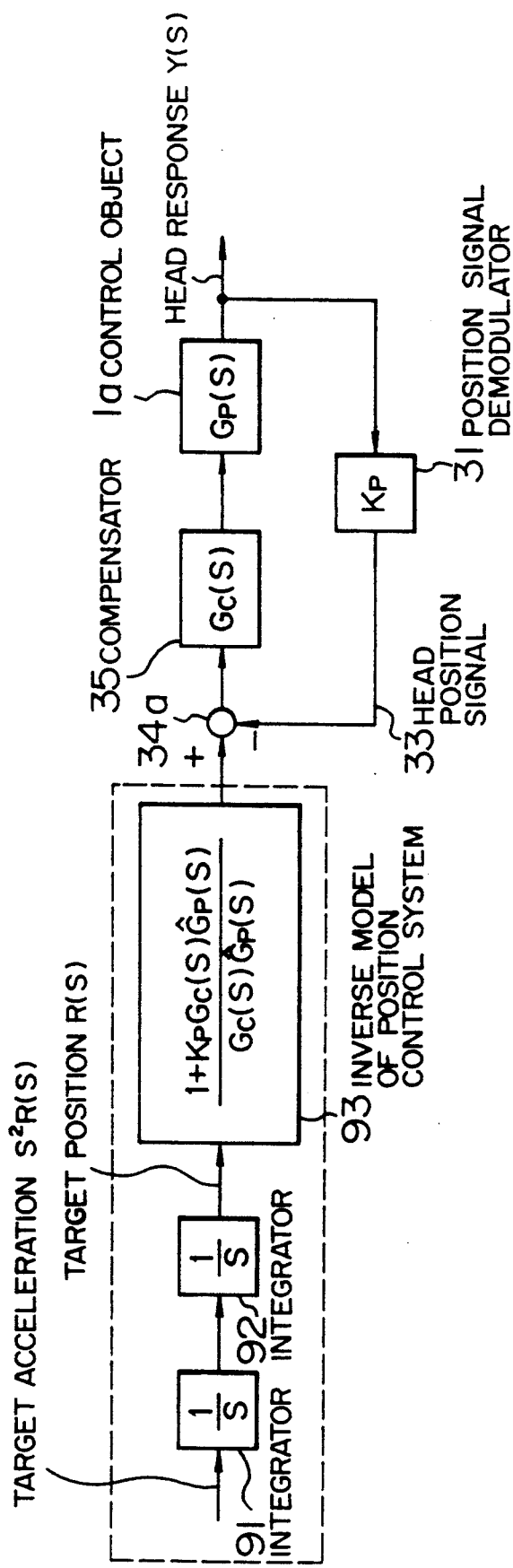
FIG. 2 is a block diagram illustrating the operation principle of the embodiment shown in FIG. 1.

Prior to describing a particular operation of the embodiment, there will be described with reference to FIG. 2 the operation principle of the microprocessor 5 shown in FIG. 1 for determining the command value. In FIG. 2, signal processing to be executed by the microprocessor 5 is performed by a circuit portion enclosed by a broken line. The microprocessor 5 digitally processes signals, which will be later described in detail.

A combination of the head positioning mechanism 15, actuator 16, and power amplifier 21 is called herein a controlled object 1a of the position control system. Assuming that the head positioning mechanism 15 is an inertial body and the actuator 16 and power amplifier 21 have a linear gain, the transfer function of a linear, inertial model $\hat{G}p(s)$ of the controlled object 1a is given by:

$$\hat{G}p(s) = \frac{Ka \cdot Kf}{mS^2} \quad (1)$$

where m is the mass of the mechanism 15, Ka is a gain of the power amplifier 21, and Kf is a force constant of the actuator 16. The compensator 35 constitutes a phase lag/lead compensator whose transfer function Gc(s) is given by:

$$Gc(s) = Kc \frac{(1 + \tau_2 s)(1 + \tau_4 s)}{(1 + \tau_1 s)(1 + \tau_3 s)} \quad (2)$$

where $\tau_1, \tau_2, \tau_3$, and $\tau_4$, are time constants and Kc is a linear gain. Defining Kp as the linear gain of the position signal demodulator 31 generating the head position signal 33 proportional to the position tracking error of the head, and using the equations (1) and (2), an approximate inverse system for the position control closed loop transfer function is given by:

$$\frac{1}{\hat{G}_{CL}(s)} = \frac{1 + KpGc(s)\hat{G}p(s)}{Gc(s)Gp(s)} \quad (3)$$

$$= Kp + \frac{1}{Gc(s)\hat{G}p(s)}$$

$$= Kp + \frac{ms^2(1 + \tau_1 s)(1 + \tau_3 s)}{KcKaKf(1 + \tau_2 s)(1 + \tau_4 s)}$$

The equation (3) represents an approximate inverse system of the actual position control system, so it is called, hereinafter where applicable, an inverse model of the position control system.

A time sequential signal representative of an ideal response to a head positioning operation (hereinafter called target position) is expressed by r(t), and a Laplace transformation of the target position is expressed by R(s). If a signal obtained when inputting a target position to the inverse model is used as a command value to the position control system, then a head operates in the manner given by the following equation:

$$Y(s) = \frac{Gc(s)Gp(s)}{1 + KpGc(s)Gp(s)} \left( \frac{R(s)}{\hat{G}_{CL}(s)} \right) \quad (4)$$

$$= \frac{1 + KpGc(s)\hat{G}p(s)}{1 + KpGc(s)Gp(s)} \frac{Gp(s)}{\hat{G}p(s)} R(s)$$

where Y(s) represents a Laplace transformation of head response. If Gp(s) is precisely equal to $\hat{G}p(s)$, the head response Y(s) equals the target position R(s) according to the equation (4). However, in practice, the head positioning mechanism 15 has a number of complicated vibration modes so that the natural vibrations of the mechanism cannot be sufficiently suppressed by using the inertial model $\hat{G}p(s)$. Thus, the head response $Y(s)$ becomes vibratory and will not equal the target position $R(s)$.

Next, there will be described a design procedure for determining a target position which can suppress such vibrations.

Figure 3:
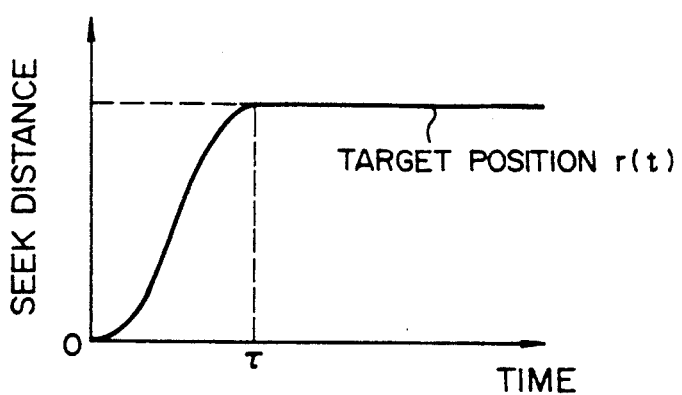
FIG. 3 is a graph showing an example of a change in seek distance relative to time.
Figure 4:
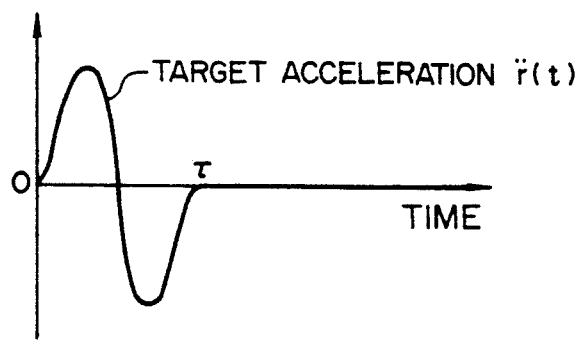
FIG. 4 is a graph showing an example of a change in target acceleration relative to time.

As shown in FIG. 3, a target position r(t) smoothly increases to a constant value at time $\tau$. The target position $\ddot{r}(t)$ differentiated twice is given by r(t) (hereinafter called target acceleration) which has a waveform as shown in FIG. 4. This target acceleration $\ddot{r}(t)$ is formulated by:

$$r(t) = dt^n(t - 0.5\tau)(t-\tau)^n \quad (5)$$

Figure 5:
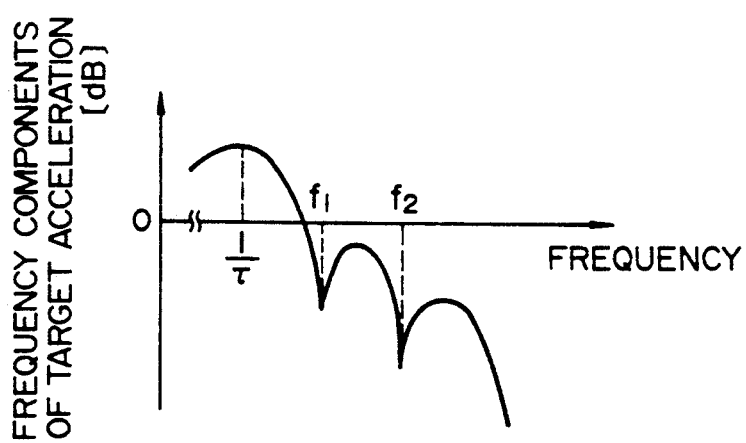
FIG. 5 is a graph showing an example of a distribution of frequency components of a target acceleration.

The frequency component of the target acceleration has turnaround frequencies f1, f2, ... as shown in FIG. 5.

The fundamental frequency of a target acceleration is $1/\tau$.

Substituting n=2, the equation (5) is given by:

$$r(t) = \begin{cases} at^2\left(t - \frac{1}{2}\tau\right)(t-\tau)^2 = \\ \alpha\left(t^5 - \frac{5}{2}\tau t^4 + 2\tau^2 t^3 - \frac{1}{2}\tau^3 t^2\right) (0 \leq t \leq t) \\ 0 \; (t > \tau) \end{cases}$$

As the Laplace-transform of the above equation, we obtain:

$$A(s) = L[r(t)] = \alpha\left(\frac{120}{s^6} - \frac{60\tau}{s^5} + \frac{12\tau^2}{s^4} - \frac{\tau^3}{s^3}\right) -$$

$$\alpha\left(\frac{120}{s^6} + \frac{60\tau}{s^5} + \frac{12\tau^2}{s^4} + \frac{\tau^3}{s^3}\right)e^{-\tau s} =$$

$$\alpha\left\{\frac{120}{s^6}(1 - e^{-\tau s}) - \frac{60\tau}{s^5}(1 + e^{-\tau s}) + \frac{12\tau^2}{s^4}(1 - e^{-\tau s}) - \frac{\tau^3}{s^3}(1 + e^{-\tau s})\right\} =$$

$$\alpha e^{-\frac{\tau}{2}s}\left\{\frac{120}{s^6}\left(e^{\frac{\tau}{2}s} - e^{-\frac{\tau}{2}s}\right) - \frac{60\tau}{s^5}\left(e^{\frac{\tau}{2}s} + e^{-\frac{\tau}{2}s}\right) + \frac{12\tau^2}{s^4}\left(e^{\frac{\tau}{2}s} - e^{-\frac{\tau}{2}s}\right) - \frac{\tau^3}{s^3}\left(e^{\frac{\tau}{2}s} + e^{-\frac{\tau}{2}s}\right)\right\}$$

The frequency characteristic of r(t) is therefore expressed by the following equation:

$$A(j\omega) = \alpha e^{-\frac{\tau\omega}{2}j}.$$

-continued $$j\left\{\left(\frac{24\tau^2}{\omega^4} - \frac{240}{\omega^6}\right)\cos\frac{\tau\omega}{2} + \left(\frac{120\tau}{\omega^5} - \frac{2\tau^3}{\omega^3}\right)\sin\frac{\tau\omega}{2}\right\}$$

The gain characteristic, which is the absolute value of the frequency characteristic, is expressed by the following equation:

$$|A(j\omega)| = \alpha\sqrt{\left(\frac{24\tau^2}{\omega^4} - \frac{240}{\omega^6}\right)^2 + \left(\frac{120\tau}{\omega^5} - \frac{2\tau^3}{\omega^3}\right)^2}\sin\left(\frac{\tau\omega}{2} + \phi\right)$$

wherein $$\phi = \tan^{-1}\frac{\frac{24\tau^2}{\omega^4} - \frac{240}{\omega^6}}{\frac{120\tau}{\omega^5} - \frac{2\tau^3}{\omega^3}} = \tan^{-1}\frac{24\tau^2\omega^2 - 240}{120\tau\omega - 2\tau^3\omega^3}$$

The turnaround frequency f1 of the target acceleration satisfies $|A(j\omega)|=0$, so substituting $\omega=2\pi f1$ we obtain:

$$m\pi = \frac{\tau \cdot 2\pi f_1}{2} + \tan^{-1}\frac{24\pi^2(2\tau f_1)^2 - 240}{120\tau(2\pi f_1) - 2\tau^3(2\pi f_1)^3} \quad (6)$$

$$= \pi\tau f_1 + \tan^{-1}\frac{96\pi^2\tau^2 f_1^2 - 240}{240\pi\tau f_1 - 16\pi^3\tau^3 f_1^3}$$

where m is an integer and $\pi$ is a ratio of a circle circumference to the diameter.

It is necessary that the time $\tau$ satisfies the following equation in order to make the turnaround frequency f1 become coincident with the resonance frequency fr:

$$\pi\tau fr + \tan^{-1}\frac{96\pi^2\tau^2 fr^2 - 240}{240\pi\tau fr - 16\pi^3\tau^3 fr^3} = m\pi \quad (6')$$

The seek time $\tau$ can be obtained by solving the equation (6') relative to time $\tau$.

Next, how the coefficient $\alpha$ is determined will be described. The equation representative of the target position at $t=\tau$ is given by the following equation through integration of the equation (5) twice:

$$x(\tau) = \int_0^\tau \int_0^\tau \ddot{r}(t)dt^2 = -\frac{\tau^7}{840} \cdot \alpha \quad (7)$$

The coefficient $\alpha$ is obtained by the following equation if a head seek distance L is known:

$$x(\tau) = -\frac{\tau^7}{840} \cdot \alpha = L \text{ thus, } \alpha = \frac{-840L}{\tau^7} \quad (7')$$

Figure 6:
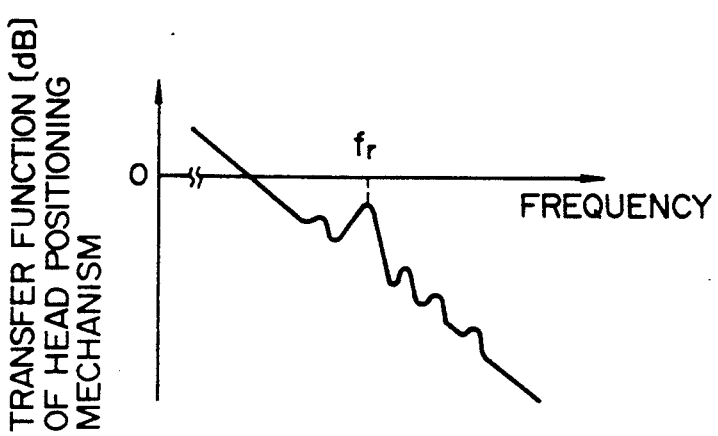
FIG. 6 is a graph showing an example of a transfer function of a head positioning mechanism.

The transfer function of the head positioning mechanism is shown in FIG. 6 in frequency domain. This transfer function can be measured through experiments. As shown in FIG. 6, the gain characteristic has a number of resonance points. Resonance of the head positioning mechanism is most likely to occur particularly at the resonance frequency indicated by fr in FIG. 6. This resonance is the main factor which deteriorates the positioning operation performance. It is therefore a requisite to prevent this resonance. To this end, the order n and seek time $\tau$ in the equation (5) are selected so that the turnaround frequency f1 of the target acceleration becomes coincident with the resonance frequency fr. Since the closed loop position control system is strictly proper and the inverse model given by the equation (2) has two differentiators, a necessary condition is that the target position can be differentiated at least twice relative to time. Therefore, in order to realize acceleration and deceleration shown in FIG. 4, the order n of the equation (5) is necessary to be $n \geq 1$. The target acceleration determined as above is integrated twice by integrators 91 and 92 shown in FIG. 2 to determine a target position. The coefficient $\alpha$ of the equation (5) is determined using the ultimate seek distance L and seek time $\tau$ of a head as described previously.

A signal obtained when inputting the target position determined in the above procedure to the inverse model given by the equation (3), is used as a position command value to the position control system. With such an arrangement, it becomes possible to suppress resonances of the head positioning mechanism 15 and speed up the positioning operation. The foregoing description has been give for explaining the principle of determining a position command value.

Next, the operation of the embodiment shown in FIG. 1 will be described. First, when CPU 6 instructs the disk controller 61 to input data into, or output data from, a magnetic disk, the microprocessor 5 calculates a position command value 38.

Figure 7:
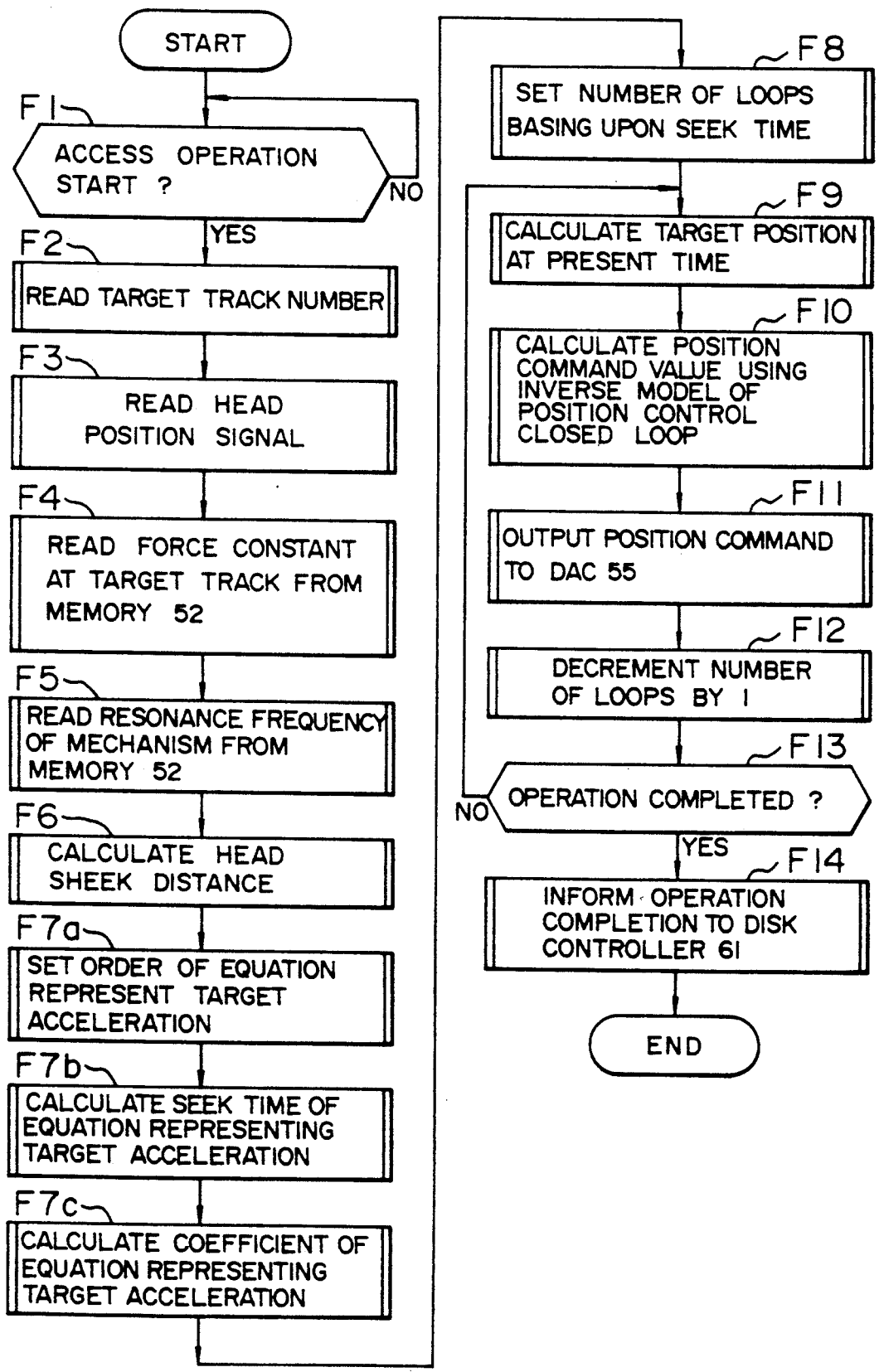
FIG. 7 is a flow chart showing an example of a procedure to be executed by the microprocessor shown in the embodiment on FIG. 1.

FIG. 7 is a flow chart illustrating the procedure to be executed by the microprocessor 5.

At step F1, it is checked if there is an access operation command for moving the head, among signals received from the disk controller 61.

If there is an access operation command, a target track number is read at step F2 from the disk controller 61.

At step F3 a head position signal 33 is read via ADC 51 in order to know the present head position.

At step F4 a force constant value of the actuator 16 at the target track is read from the memory 52. Force constants of the actuator are stored in advance in the memory 52 in the form of table, because the force constant may change with the position of a head.

At step F5 the resonance frequency fr of the head positioning mechanism which most adversely effects the positioning operation, is read from the memory 52.

At step F6 a head seek distance is calculated from the number of tracks between the head present position to the target track.

At step F7a in accordance with the force constant value of the actuator 16 and resonance frequency of the positioning mechanism there is set the order n of the function (5) representative of the target acceleration, e.g., the order n is set as n=2.

At step F7b, a seek time $\tau$ is calculated using the equation (6).

At step F7c, the seek distance L obtained at step F6 and the seek time $\tau$ obtained at step F7b are substituted into the equation (7) to calculate the coefficient $\alpha$.

At step F8, there is calculated the number of loops of the succeeding processes to be repeated, by dividing the seek time $\tau$ determined at step F7b by the unit process time of the microprocessor 5.

The above processes are executed prior to outputting a position command value. The succeeding processes are a sequential procedure to be executed after the start of a head seek operation.

At step F9, the target acceleration is integrated twice with respect to time to obtain a target position at the present time.

At step F10, the target position is inputted to the inverse model to calculate a position command value.

At step F11, the position command value is outputted to DAC 55.

At step F12, the number of loops is decremented by 1. The control returns from step F13 to F9 to repeat the operations of outputting a position command value at a predetermined period until the end of a seek operation (loop number=0).

At step F14, completion of the seek operation is informed to the disk controller 61.

The position control is performed in accordance with the error from the position command which is calculated in the manner stated above.

According to this embodiment, high speed positioning is possible only with a position control, while suppressing resonances at natural vibrations of the head positioning mechanism in accordance with the design procedure of the target acceleration, and compensating a time delay inherent to a closed loop system by using the inverse model of the position control system.

In the above embodiment, each position command value is calculated in real time. Instead of calculating all command values in real time during the head seek operation, at least some position command values calculated beforehand and stored in a memory in the form of table or map may be used. For example, if the above-described procedure is applied only to the case where the seek distance is fixed and constant, such as the case where a head is moved to the next adjacent track, then time sequential command values calculated beforehand and stored in the memory 52 may be sequentially read by the microprocessor 5 in an actual operation. With such an arrangement, even if a low-speed, cheap microprocessor is used, high speed positioning is possible.

Figure 8:
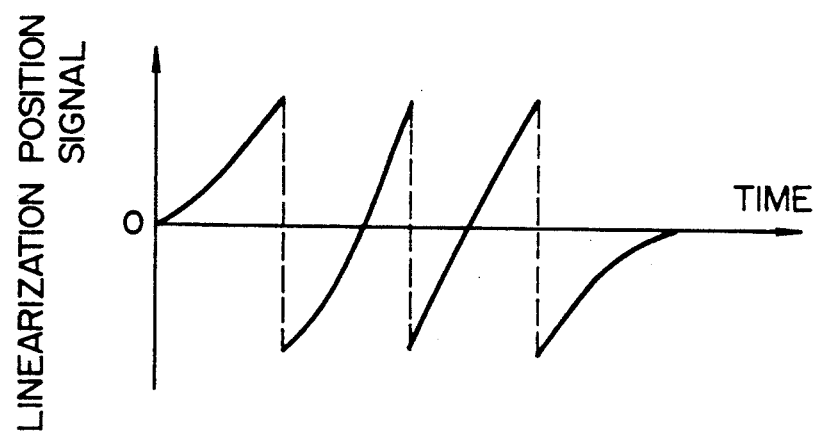
FIG. 8 is a graph showing an example of a waveform of a linear position signal.

Most of the present magnetic disk drives use a pair of two-phase position signals. In this two-phase position signal method, one of two triangle position signals having a phase difference of 90 degrees is selected, the selected one being proportional to a head position deviation. Therefore, an obtained head position signal contains discontinuities at boundaries between adjacent tracks. This head position signal is called herein a linear position signal. The head position signal a waveform over three adjacent tracks is shown in FIG. 8. According to the present invention, of a seeking/tracking operation of a head in one track or more, it is necessary to detect a position deviation from the center of an object track so that a tracking error relative to each position command value can be continuously detected during the operation.

Figure 9:
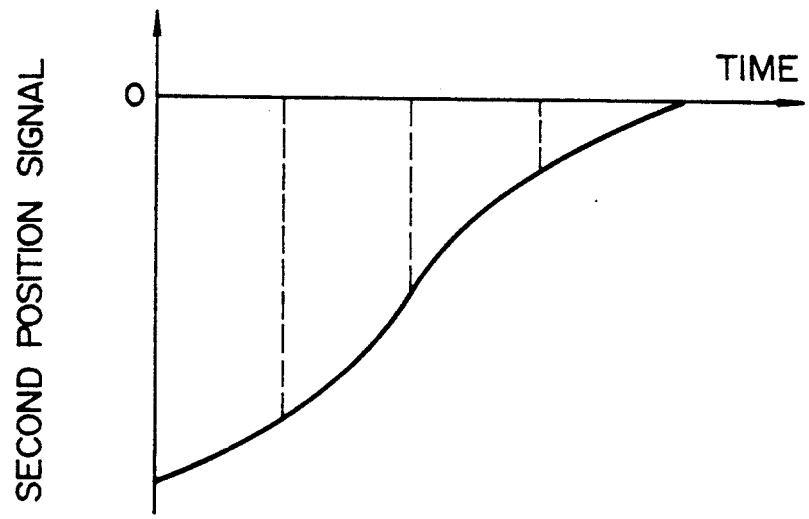
FIG. 9 is a graph showing an example of a waveform of a second position signal obtained from the linear position signal.

Accordingly, the position signal demodulator 31 shown in FIG. 1 has means for generating a continuous second position signal obtained by removing the discontinuous points of the linear position signal. The second position signal represents a position deviation from the center of a target track, as shown in FIG. 9, and is fed back to the comparator 34. The second position signal is obtained by subtracting from the linear position signal a value of (track width) x (number of remaining tracks to a target track) x (position deviation detecting gain (constant value)).

Figure 10:
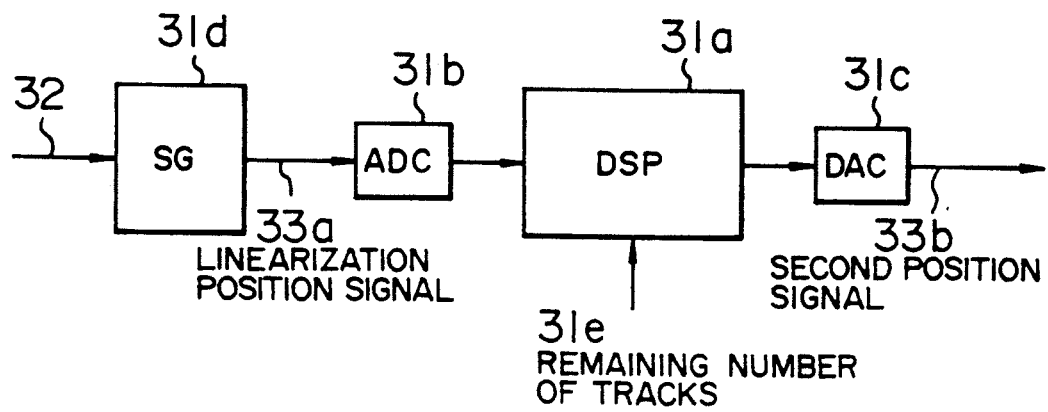
FIG. 10 is a block diagram showing an example of a circuit which generates the second position signal using the linearization position signal.

The circuit arrangement for obtaining a second position signal is shown in FIG. 10. A signal generator 31d generates a discontinuous linear position signal 33a using a servo signal 32. The linear position signal 33a is supplied via an ADC 31b to a digital signal processor (DSP) 31a. DSP 31a performs the above-described calculation to obtain a second position signal 33b which is then outputted from a DAC 31c.

According to this embodiment, the advantageous effects with the high speed position control procedure described above can be obtained by providing the means for generating the second position signal by removing discontinuous points, without changing the types of a servo signal and a two-phase position signal.

Another embodiment of the present invention will be described with reference to FIGS. 11 and 12. In these figures, like elements to those shown in FIGS. 1 and 2 are represented by adding 100 via reference numerals used therein, and the description thereof is omitted.

Figure 11:
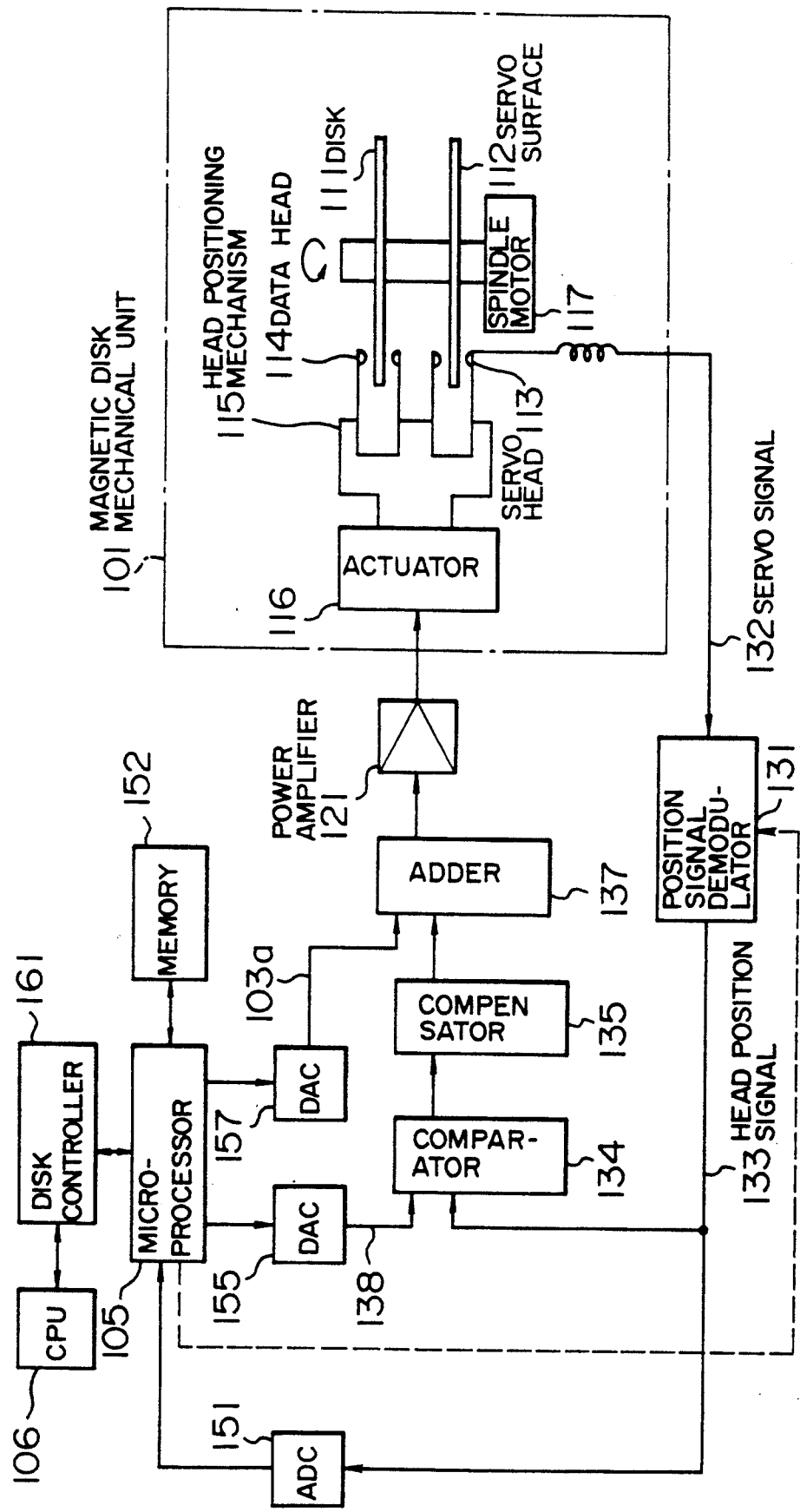
FIG. 11 is a block diagram showing another embodiment of a disk drive according to the present invention.

FIG. 11 is a block diagram showing the structure of a disk drive according to the present embodiment.

The different points of this embodiment from that shown in FIG. 1 are as follows:

a) a microprocessor 105 outputs not only a position command value 138 via a DAC 155 but also an acceleration command value 103a via a DAC 157.

b) There is provided an adder 137 in the position control system so as to add the acceleration command value 103a to an output of a compensator 135.

Figure 12:
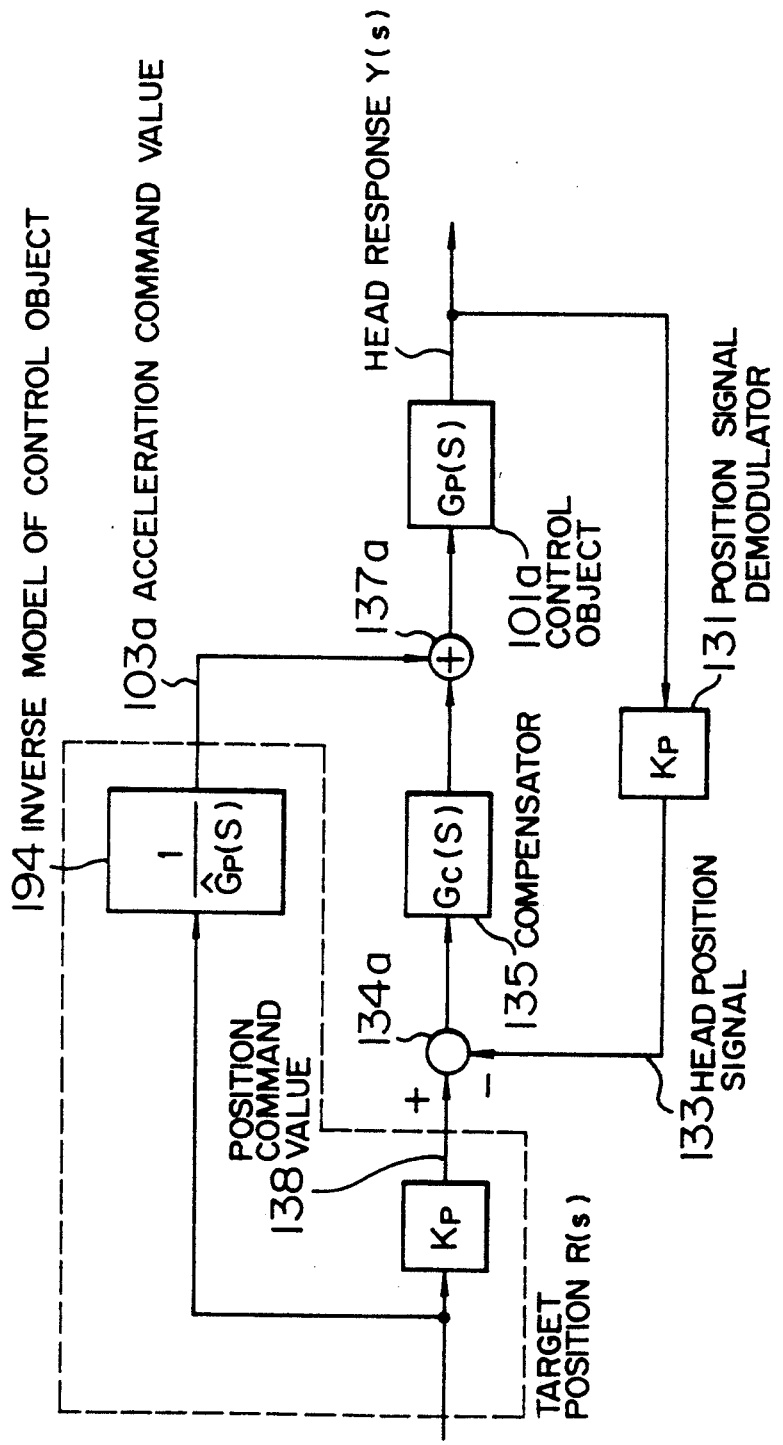
FIG. 12 is a block diagram illustrating the operation principle of the embodiment shown in FIG. 11.

Referring to FIG. 12, the operation principle of the present embodiment will be described. In FIG. 12, signal processing to be executed by the microprocessor 105 is performed by a circuit portion enclosed by a broken line. The microprocessor 105 digitally processes signals. The procedure to be executed by the microprocessor 105 is substantially the same as illustrated in the flow chart of FIG. 7 of the FIG. 1 first embodiment, so the description thereof is omitted. A combination of a head positioning mechanism 115, actuator 116, and power amplifier 121 is called herein a controlled object 101a of the position control system whose transfer function is represented by Gp(s). Although the controlled object 101a has complicated vibration modes, it is represented by a simple model in the form of transfer function. A model 194 inverse to the controlled object is represented by an inverse transfer function 1/Ĝp(s). The gain of a position signal demodulator 131 for detecting a position deviation is linear and is represented by Kp.

A time sequential value r(t) of the target position is designed in the same manner as the procedure described when explaining the principle of determining a position command value in the first embodiment. Kp.R(s) is used as the position command value 138, and R(s)/Ĝp(s) is used as the acceleration command value 103a, where R(s) is a Laplace transformation of the time sequential target position r(t). The following equations demonstrate that the head response provides the same results given by the equation (4) described with the FIG. 1 embodiment:

$$Y(s) = \frac{Gp(s)}{\hat{G}p(s)} R(s) + KpGc(s)Gp(s) \{R(s) - Y(s)\}$$

$$\{1 + KpGc(s)Gp(s)\} Y(s) = \{1 + KpGc(s)\hat{G}p(s)\} \frac{Gp(s)}{\hat{G}p(s)} R(s)$$

-continued
$$\therefore Y(s) = \frac{1 + KpGc(s)\hat{G}p(s)}{1 + KpGc(s)Gp(s)} \frac{Gp(s)}{\hat{G}p(s)} R(s) \quad (8)$$

when applying the above principle to the head position control system, the operations of elements are substantially the same as described with FIG. 1. The microprocessor 105 determines parameters of the function representing target acceleration, starts executing the loop processes, and calculates a target position by integrating the target acceleration twice with respect to time. Using the calculated target position, the position command value and acceleration command value are calculated and supplied to DAC 155 and DAC 157.

According to this embodiment, the advantageous effects the same as in the FIG. 1 first embodiment can be obtained. The FIG. 1 first embodiment uses an inverse model of the whole position control system, whereas the present embodiment uses an inverse model of only the controlled object. Therefore, the procedure of calculating the command value is simpler than in the FIG. 1 first embodiment.

A further embodiment of the present invention will be described with reference to FIGS. 13, 14, and 15.

In this embodiment, a head is moved rapidly and reliably to a target position, using a combination of the head position control described with the FIG. 1 embodiment and a velocity control.

Figure 13:
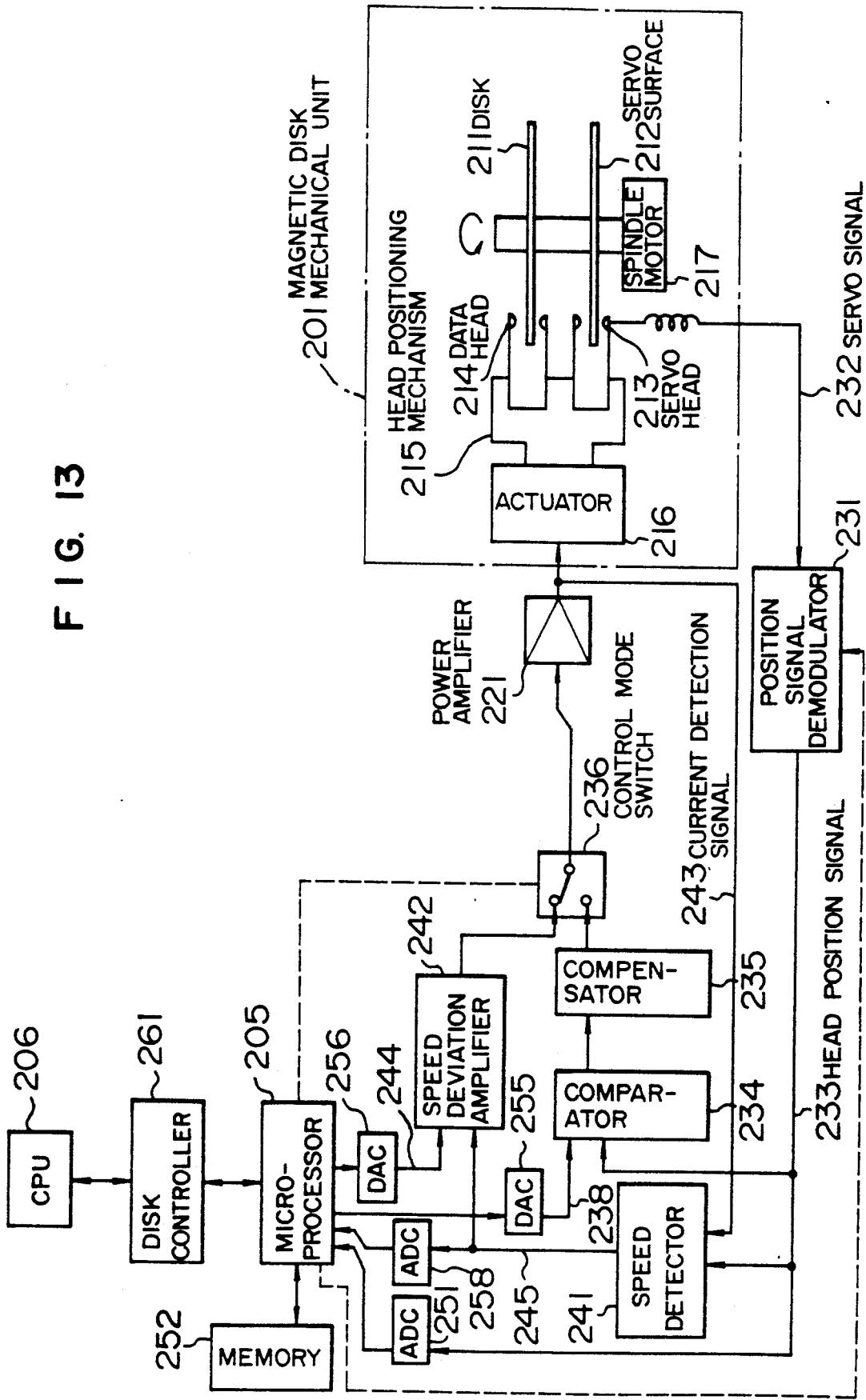
FIG. 13 is a block diagram showing a further embodiment of a disk drive according to the present invention.

In FIG. 13, like elements to those shown in FIG. 11 are represented by adding 200 to reference numerals used therein, and the description thereof is omitted.

FIG. 13 is a block diagram showing the structure of a disk drive according to the present embodiment. In FIG. 13, a magnetic disk drive mechanical unit 201 operates in the same manner as the above-described embodiments. A position signal demodulator 231 receives a servo signal 232 and outputs a head position signal 233 proportional to a position deviation of the head.

When a CPU 206 instructs a disk controller 261 to input data into, or output data from, a magnetic disk, a microprocessor 205 sequentially calculates a velocity command value and position command value to be used for positioning the head and outputs them to DACs 256 and 255. A memory 252 stores therein programs for the microprocessor 205 and other constants necessary for calculation. The details of calculations by the microprocessor 205 will be described later.

A speed detector 241 combines an approximate differentiation of the head position signal 233 and an approximate integration of a current detection signal 243 to output a signal 245 proportional to a head speed. A velocity tracking error amplifier 242 subtracts the detected speed 245 from a speed command value 244 and linearly amplifies the difference therebetween. A control mode switch 236 is used for switching the speed control to the position control during a head positioning operation. This switching is carried out by the microprocessor 205 in accordance with a predetermined condition.

Figure 14:
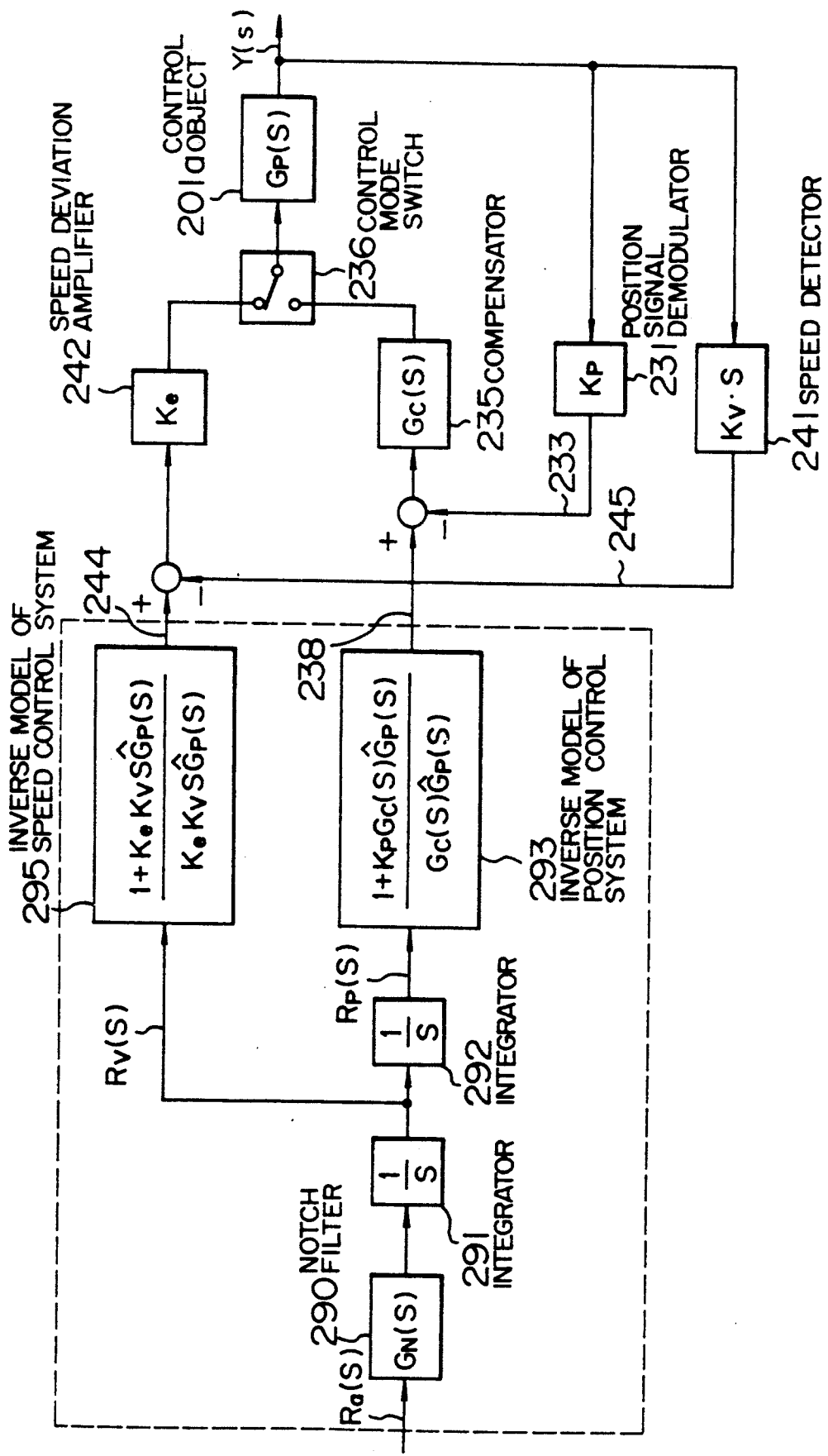
FIG. 14 is a block diagram illustrating the operation principle of the embodiment shown in FIG. 13.

Referring to FIG. 14, the principle of determining the velocity and position command values by the microprocessor 205 shown in FIG. 13 will be described. Also in this embodiment, similar to the first embodiment, a head is subject to the seeking/tracking operation by acceleration and deceleration described with reference to FIG. 4. A target acceleration is therefore formulated with respect to time as in the following equation:

$$r_a(t) = dt^n(t - 0.5\tau)(t - \tau)^n \tag{9}$$

A Laplace transformation of the target acceleration is represented by Ra(s). The frequency component of the target acceleration has turnaround frequencies f1, f2, ... as shown in FIG. 5, and the transfer function of the head positioning mechanism has a response frequency fr as shown in FIG. 6. If the order n and access time $\tau$ of the target acceleration cannot be designed such that the turnaround frequency becomes coincident with the resonance frequency, the target acceleration is corrected using a notch filter whose gain is slower at the resonance frequency fr, the notch filter having a transfer function given by:

$$G_N(s) = \frac{S^2 + 2\zeta'_N \omega_N S + \omega_N^2}{S^2 + 2\zeta_N \omega_N S + \omega_N^2} \tag{10}$$

The coefficient $\alpha$ of the target acceleration is determined in accordance with an eventual seek distance of the head. The target acceleration designed in the above manner is integrated with respect to time once and twice to obtain a target velocity Rv(s) and target position Rp(s), respectively, which are given by:

$$Rv(s) = \frac{1}{S} G_N(s) Ra(s) \tag{11}$$

$$Rp(s) = \frac{1}{S^2} G_N(s) Ra(s) \tag{12}$$

Next, an inverse model for a closed loop transfer function of the speed control system and position control system is defined. A combination of the head positioning mechanism 215, actuator 216, and power amplifier 221, is called a controlled object 201a whose transfer function is represented by Gp(s) and simplified transfer function by $\hat{G}p(s)$. The velocity detector 241 can be modeled as a differentiator for differentiating a head position response Y(s), by:

$$G_V(s) = K_v \cdot S \tag{13}$$

where Kv is a linear gain. A linear gain of the speed difference amplifier is represented by Ke. With the above definitions, a transfer function of a signal path from the speed command value 244 to the detected speed 245 can be modeled as:

$$Gsp(s) = \frac{KeKvS\hat{G}p(s)}{1 + KeKvS\hat{G}p(s)} \tag{14}$$

Therefore, an inverse system of the equation (14) (inverse model of the velocity control system) is given by the following equation:

$$\frac{1}{\hat{G}sp(s)} = \frac{1 + KeKvS\hat{G}p(s)}{KeKvS\hat{G}p(s)} \tag{15}$$

The inverse model of the position control system is given as described with reference to the FIG. 1 embodiment, by:

$$\frac{1}{\hat{G}_{CL}(s)} = \frac{1 + KpGc(s)\hat{G}p(s)}{Gc(s)\hat{G}p(s)} \tag{16}$$

Next, a method of determining a velocity command value and position command value will be described. As the velocity command value, there is used an output obtained when inputting a target speed of the equation (11) to the inverse model of the speed control system of the equation (15). As the position command value, there is used an output obtained when inputting a target position of the equation (12) to the inverse model of the position control system of the equation (16).

Next, the operation of the embodiment shown in FIG. 13 will be described. When CPU 206 instructs disk controller 261 to input data into, or output data from, a magnetic data, microprocessor 205 switches the control mode switch 236 to the velocity control system side and calculates and outputs a velocity command value 244 and position command value 238.

Figure 15A:
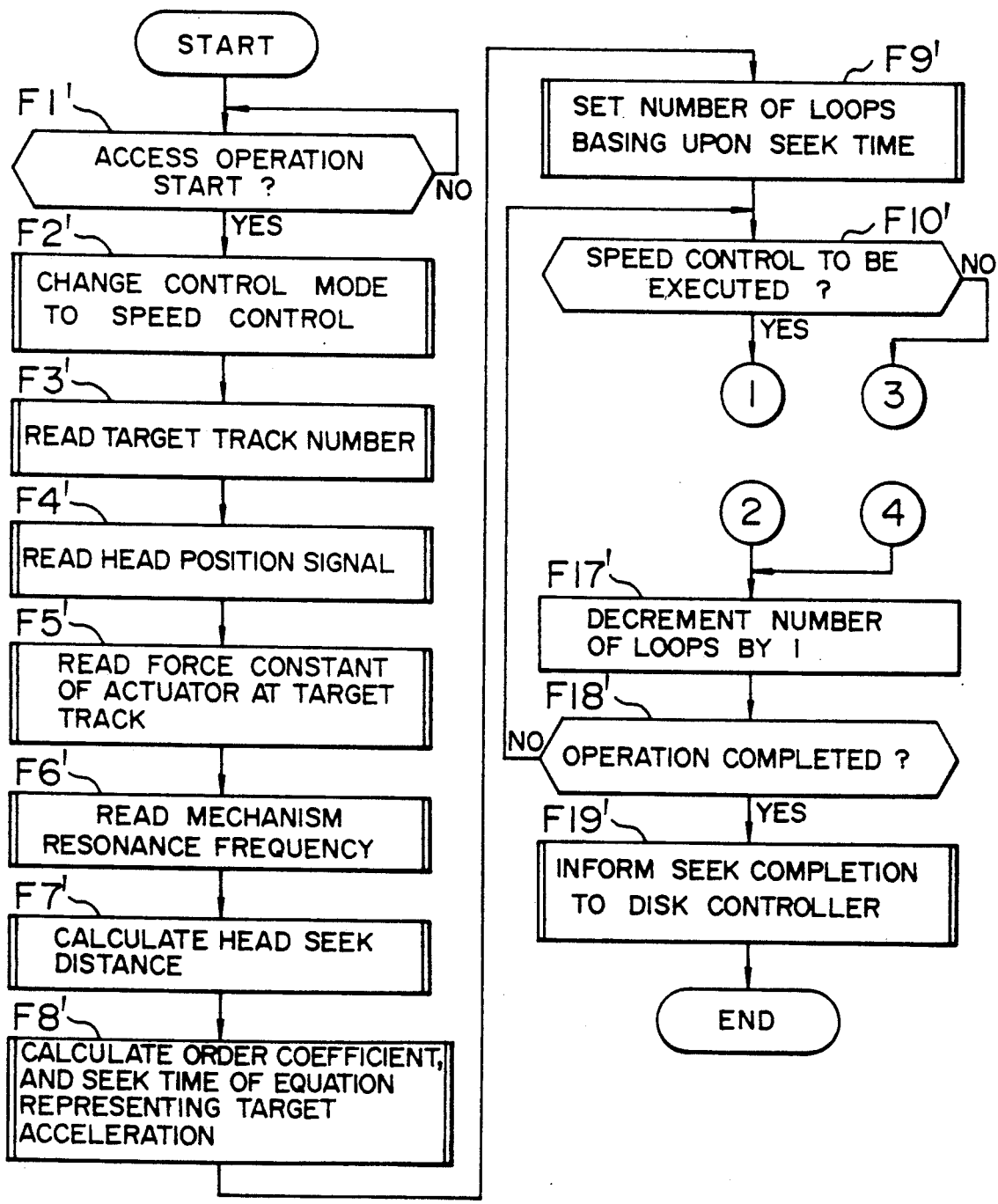
FIGS. 15A to 15C are flow charts showing an example of the procedure to be executed by the microprocessor of the embodiment shown in FIG. 13.
Figure 15B:
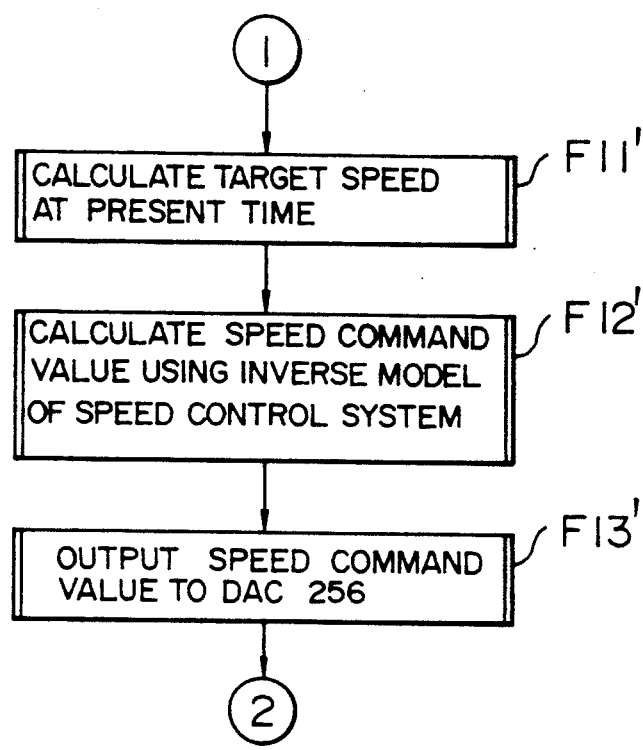
Figure 15C:
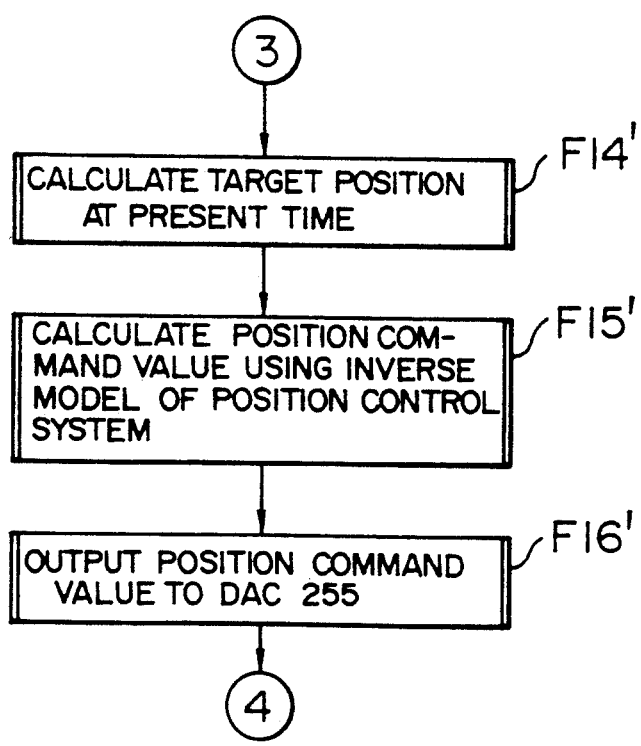

FIG. 15 is a flow chart illustrating the procedure to be executed by the microprocessor 205.

At step F1', it is checked if there is an access operation command for moving the head, among signals received from the disk controller 261.

At step F2', the control mode switch 236 selects the velocity control system.

At step F3', a target track number is read from the disk controller 261.

At step F4', a head position signal is read via ADC 251 in order to know the present head position.

At step F5', a force constant value of the actuator at the target track is read. Force constants of the actuator are stored in advance in the memory 252 in the form of table, because the force constant may change with the position of a head.

At step F6', the resonance frequency fr of the head positioning mechanism which most adversely effects the positioning operation, is read from the memory 252.

At step F7', a head seek distance is calculated from the number of tracks from the head present position to the target track.

At step F8', in accordance with the force constant value of the actuator 216 and the resonance frequency of the positioning mechanism and head seek distance there are determined the order n of the function (9) representative of the target acceleration, seek distance $\tau$, and coefficient $\alpha$, in a similar manner described at steps F7a, F7b, and F7c shown in FIG. 7.

At step F9', there is calculated the number of loops of the succeeding processes to be repeated, by dividing the determined seek time $\tau$ by the unit process time of the microprocessor 205.

The above processes are pre-processes. The succeeding processes are a sequential procedure to be executed after the start of a head seek operation.

The velocity control is performed until the head reaches near the target track. Therefore, a judgment at step F10' is affirmative.

At step F11', a target velocity is calculated using the equation (11).

At step F12', the target velocity is inputted to the inverse model of the velocity control system to calculate a velocity command value.

At step F13', the velocity command value is outputted to DAC 256. After the head reaches near the target track, the control mode switch selects the position control system, s that a judgment at step F10' is negative.

At step F14', a target position is obtained using the equation (12).

At step F15', the target position is inputted to the inverse model of the position control system to calculate a position command value.

At step F16', the position command value is outputted to DAC 255.

In both the velocity and position controls, the number of loops is decremented by 1.

The control returns from step F18' to F10' to repeat the operation of outputting position or speed command value at a predetermined period until a seek operation is completed, i.e., until the number of loops becomes 0.

At step F19', a completion of the seek operation is informed to the disk controller 261.

By using the speed command value 244 and position command value 238 thus obtained, the position and speed controls are conducted. The condition under which the control mode switch 236 is turned over is assumed for example to be that the head reaches within one track from the center of a target track and that the detected speed 245 lowers to a predetermined value. For such switching operation, the microprocessor 205 always picks up the detected speed signal 245 from ADC 258.

A still further embodiment of the present invention will be described with reference to FIGS. 16 and 17.

In this embodiment, a head is moved rapidly and reliably to a target position, using a combination of the head position control described with reference to the FIG. 11 embodiment and the speed control described with FIG. 13 embodiment.

Figure 16:
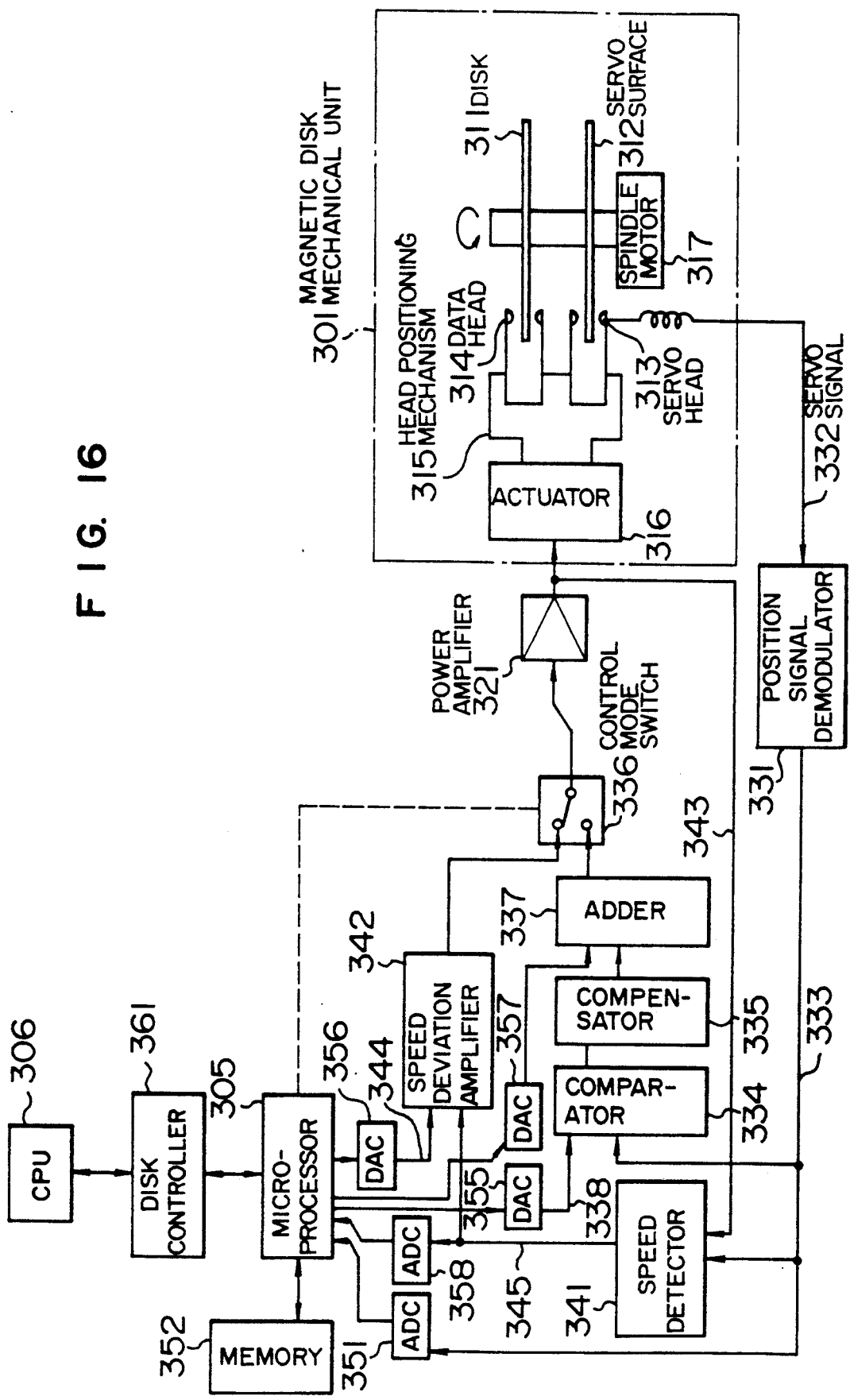
FIG. 16 is a block diagram showing a still further embodiment of a disk drive according to the present invention.

In FIG. 16, like elements to those described with the above embodiments are represented by adding 300 to reference numerals used therein, and the description thereof is omitted.

FIG. 16 is a block diagram showing the structure of a disk drive according to the present embodiment. In FIG. 16, a magnetic disk drive mechanical unit 301 operates in the same manner as the above-described embodiments. A position signal demodulator 331 receives a servo signal 332, and outputs a head position signal 333 proportional to a position deviation of the head.

When a CPU 306 instructs a disk controller 361 to input data into, or output data from, a magnetic disk, a microprocessor 305 sequentially calculates a velocity command value and position command value to be used for positioning the head, and outputs them via DACs 356 and 355. A memory 352 stores therein programs for the microprocessor 305 and other constants necessary for calculation. The calculation operation by the microprocessor 305 is substantially the same as the FIG. 13 embodiment, so the description thereof is omitted.

A velocity detector 341 combines an approximate differentiation of the head position signal 333 and an approximate integration of a current detection signal 343 to output a signal 345 proportional to a head speed. A speed tracking error amplifier 342 subtracts the detected speed 345 from a velocity command value 344 and linearly amplifies the difference therebetween. A control mode switch 336 is used for switching the velocity control to the position control during a head positioning operation. This switching is carried out by the microprocessor 305 in accordance with a predetermined condition.

Figure 17:
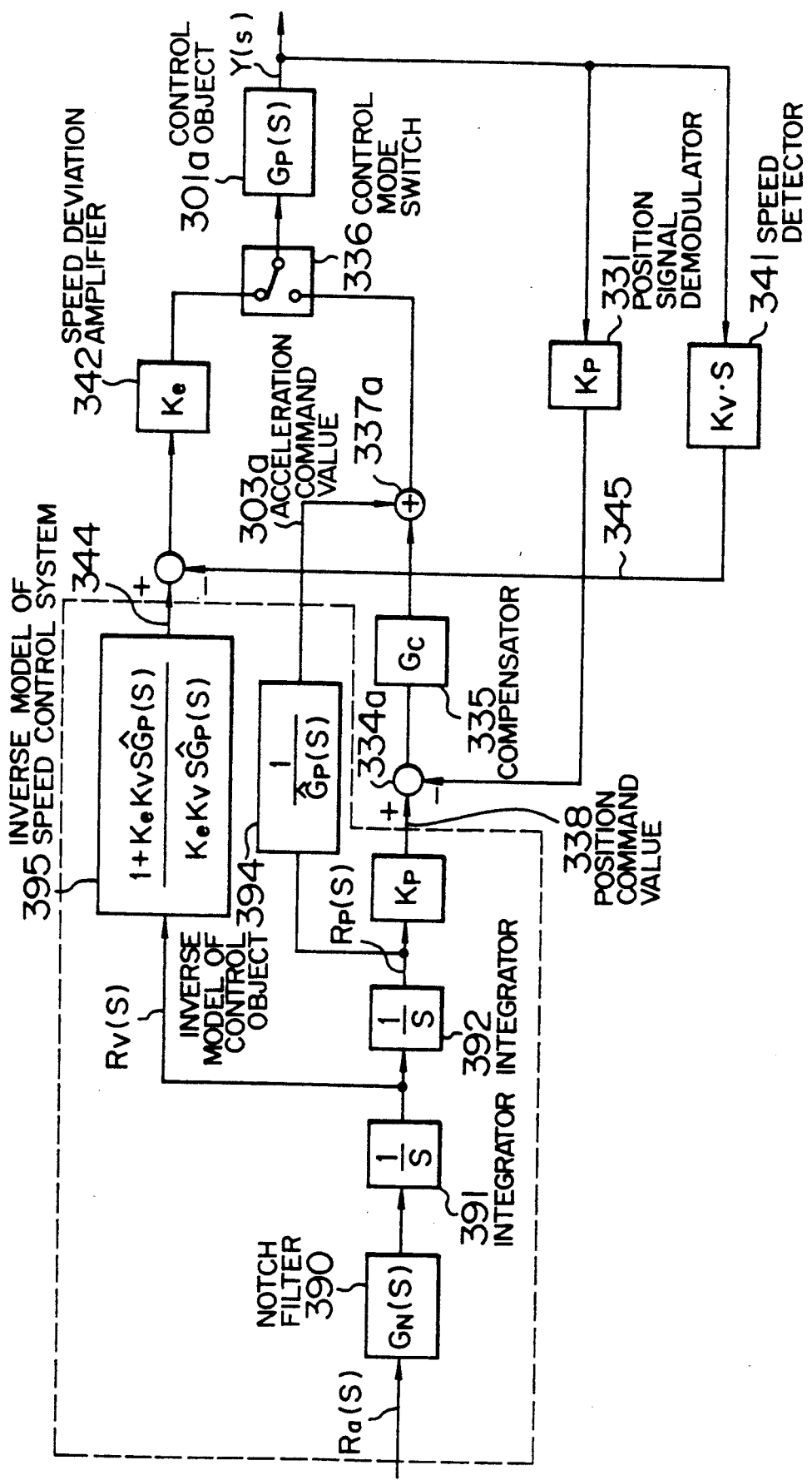
FIG. 17 is a block diagram illustrating the operation principle of the embodiment shown in FIG. 16.

FIG. 17 illustrates the principle of determining the velocity and position command values by the microprocessor 305. Signal processing to be executed by the microprocessor 305 is performed by a circuit portion enclosed by a broken line. The microprocessor determines the velocity command value in a manner substantially the same as in the FIG. 13 embodiment and the position command value in a manner substantially the same as in the FIG. 11 embodiment, so the description thereof is omitted.

According to the embodiments shown in FIGS. 13 and 16, both the speed and position control systems are used to position a head at a high velocity while suppressing resonances of the head positioning mechanism.

Specifically, head acceleration will not change abruptly when the speed control system is switched to the position control system, thereby suppressing residual vibrations and shortening the seek time. According to the present invention, an abrupt change in head acceleration can be avoided because the target velocity and position are designed based upon a single target acceleration, and a control input to the actuator is continuous before and after the switching time.

Figure 18:
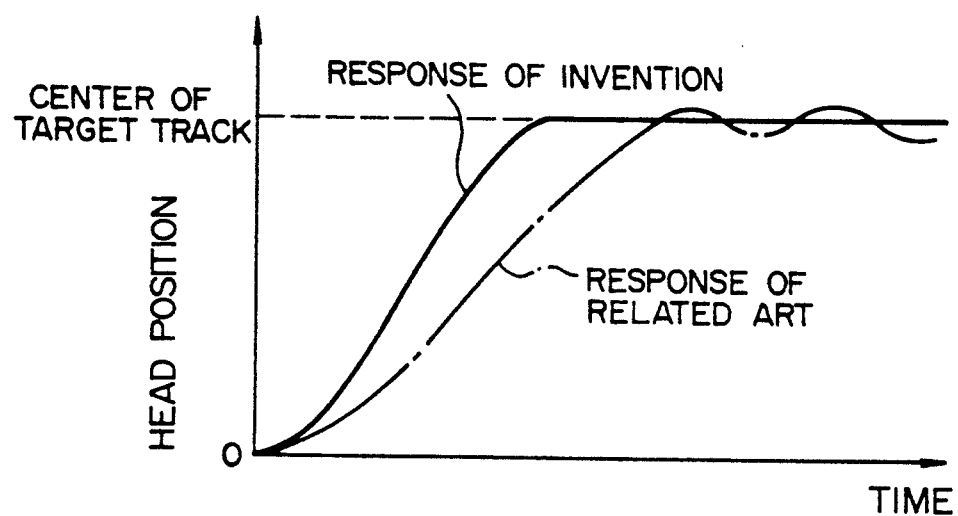
FIG. 18 is a graph showing a comparison of head positioning operation responses between the present embodiments and the related art.

FIG. 18 is a graph showing a comparison of head positioning operation response between the present embodiments and the related art.

Figure 19:
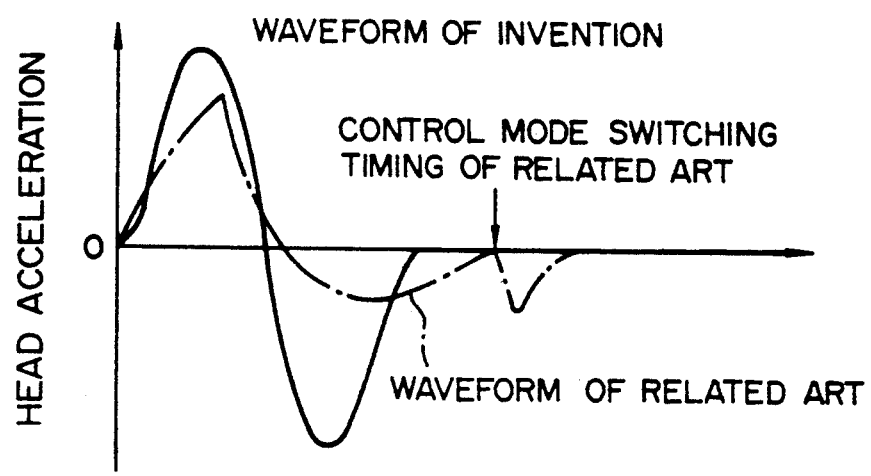
FIG. 19 is a graph showing a comparison of head acceleration waveforms during head positioning operations between the present embodiments and the related art.

FIG. 19 is a graph showing a comparison of head acceleration waveforms during head positioning operations between the present embodiments and the related art.

From these response waveforms, it is apparent that the seek time of the present invention is shorter than that of the related art.

The notch filter described with FIGS. 14 and 17 may be used with the embodiments shown in FIGS. 1 and 11. Furthermore, the present invention is applicable to a magnetic drive dedicated to reproduction only.

While particular embodiments of the present invention have been shown and described, it will be obvious to those skilled in the art that various changes and modifications may be made without departing from the present invention in its broader aspects.

What is claimed is:

1. A disk drive comprising:
   a data recording medium disk;
   a head disposed facing a recording surface of said disk, for reading and writing data;
   a positioning mechanism for supporting and moving said head;
   means for detecting a position of said head and outputting a position detection signal; and
   control means for processing said position detection signal and outputting a position control signal to said positioning mechanism,
   said control means having,
   means for calculating a target acceleration signal for a given target track so as to make a turnaround frequency of a frequency component of said target acceleration signal coincident with a resonance frequency of said head positioning mechanism,
   means for calculating a target position for head positioning operation in accordance with said target acceleration signal,
   means for calculating a position command value by inputting said target position signal to a model (inverse model) of an approximate inverse system to a position control system which includes said head positioning mechanism and said position signal detecting means, and means for outputting a position tracking error to said positioning mechanism, said position tracking error being a difference between a result calculated by said position command value calculating means and said position detection signal of said head.

2. A disk drive comprising:

a data recording medium disk;

a head disposed facing a recording surface of said disk, for reading and writing data;

a positioning mechanism for supporting and moving said head;

means for detecting a velocity of said head and outputting a velocity detection signal; and control means for processing said velocity detection signal and outputting a velocity control signal to said positioning mechanism, said control means having, means for calculating a target acceleration signal for a given target so as to make a turnaround frequency of a frequency component of said target acceleration signal coincident with a resonance frequency of said head positioning mechanism;

means for calculating a target velocity for a head positioning operation in accordance with said target acceleration signal, means for calculating a velocity command value by inputting said target velocity signal to a model (inverse model) of an appropriate inverse system to a velocity control system which includes said head positioning mechanism and said velocity signal detecting means, and means for outputting a velocity tracking error to said positioning mechanism, said velocity tracking error being a difference between a result calculated by said velocity command value calculating means and said velocity detection signal of said head.

3. A disk drive comprising:

a data recording medium disk;

a head disposed facing a recording surface of said disk, for reading and writing data;

a positioning mechanism for supporting and moving said head;

means for detecting a position of said head and outputting a position detection signal; and control means for processing said position detection signal and outputting a position control signal to said positioning mechanism, said control means having, means for calculating a target acceleration signal for a given target track so as to make a turnaround frequency of a frequency component of said target acceleration signal coincident with a resonance frequency of said head positioning mechanism, means for calculating a target position for a head positioning operation in accordance with said target acceleration signal, means for calculating a first command value by multiplying said target position signal by a gain of said head position detecting means, means for outputting a position tracking error which is a difference between said first command value and said head position detecting signal, means for calculating a second command value by inputting said target position signal to a model (inverse model) having an approximate, inverse transverse function of said head positioning mechanism, and means for outputting said position control signal obtained by adding said second command value to an output of said position tracking error outputting means.

4. A disk drive according to claim 1 further comprising:

means for detecting a velocity of said head and output a velocity detection signal;

control means for processing said velocity detection signal and outputting a velocity control signal to said positioning mechanism, said control means for velocity control having, means for calculating a target velocity for a head positioning operation in accordance with said target acceleration signal;

means for calculating a velocity command value by inputting said target velocity signal to a model (inverse model) of an approximate inverse system to a velocity control system which includes said head positioning mechanism and said velocity signal detecting means, and means for outputting a velocity tracking error to said positioning mechanism, said velocity tracking error being a difference between a result calculated by said velocity command value calculating means and said velocity detection signal of said head; and means for selecting either an output of said control means for outputting said position control signal or an output of said control means for outputting said velocity control signal, and outputting said selected output to said position determining mechanism.

5. A disk drive according to claim 3 further comprising:

means for detecting a velocity of said head and outputting a speed detection signal;

control means for processing said velocity detection signal and outputting a velocity control signal to said positioning mechanism, said control for velocity control means having, means for calculating a target velocity for a head positioning operation in accordance with said target acceleration signal, means for calculating a velocity command value by inputting said target velocity signal to a model (inverse model) of an approximate inverse system to a velocity control system which includes said head positioning mechanism and said velocity signal detecting means, and means for outputting a velocity tracking error to said positioning mechanism, said velocity tracking error being a difference between a result calculated by said velocity command value calculating means and said velocity detection signal of said head; and means for selecting either an output of said control means for outputting said position control signal or an output of said control means for outputting said velocity control signal, and outputting said selected output to said position determining mechanism.

6. A disk drive according to claim 1, wherein said target position signal calculating means calculates said target position signal by integrating twice said target acceleration calculated by said target acceleration signal calculating means.

7. A disk drive according to claim 3, wherein said target position signal calculating means calculates said target position signal by integrating twice said target acceleration calculated by said target acceleration signal calculating means.

8. A disk drive according to claim 4, wherein
said target position signal calculating means calculates said target velocity signal by integrating once said target acceleration calculated by said target acceleration signal calculating means, and
said target position signal calculating means calculates said target position signal by integrating twice said target acceleration calculated by said target acceleration signal calculating means.

9. A disk drive according to claim 1, wherein
said target acceleration signal calculating means includes means for obtaining said target acceleration signal as a signal obtained by inputting an ideal acceleration/deceleration pattern for a head positioning operation to a notch filter which removes a resonance frequency component of said head positioning mechanism, and
said target position signal calculating means calculates said target position signal by integrating twice said target acceleration calculated by said target acceleration signal calculating means.

10. A disk drive according to claim 3, wherein
said target acceleration signal calculating means includes means for obtaining said target acceleration signal as a signal obtained by inputting an ideal acceleration/deceleration pattern for a head positioning operation to a notch filter which removes a resonance frequency component of said head positioning mechanism, and
said target position signal calculating means calculates said target position signal by integrating twice said target acceleration calculated by said target acceleration signal calculating means.

11. A disk drive according to claim 4, wherein
said target acceleration signal calculating means includes means for obtaining said target acceleration signal as a signal obtained by inputting an ideal acceleration/deceleration pattern for a head positioning operation to a notch filter which removes a resonance frequency component of said head positioning mechanism,
said target velocity signal calculating means calculates said target velocity signal by integrating once said target acceleration calculated by said target acceleration signal calculating means, and
said target position signal calculating means calculates said target position signal by integrating twice said target acceleration calculated by said target acceleration signal calculating means.

12. A disk drive according to claim 1, wherein said model of an approximate inverse system for said position command value calculating means includes a model obtained by assuming said head positioning mechanism as an inertial body.

13. A disk drive according to claim 3, wherein said model of an approximate inverse system for said position command value calculating means includes a model obtained by assuming said head positioning mechanism as an inertial body.

14. A disk drive according to claim 4, wherein said model of an approximate inverse system for said position command value calculating means includes a model obtained by assuming said head positioning mechanism as an inertial body.

15. A disk drive according to claim 1, further comprising:
means for storing command value data calculated in advance in the form of a table of map, as at least some of the calculation results of said calculating means of said position control signal outputting means,
wherein said position control signal outputting means outputs said data read from said storing means as said position control signal.

16. A disk drive according to claim 3, further comprising:
means for storing command value data calculated in advance in the form of a table or map, as at least some of the calculation results of said calculating means of said position control signal outputting means,
wherein said position control signal outputting means outputs said data read from said storing means as said position control signal.

17. A disk drive according to claim 4, further comprising:
means for storing command value data calculated in advance in the form of a table or map, as at least some of the calculation results of said calculating means of said position control signal outputting means, said data read from said storing means being outputted as said position control signal; and
means for storing command value data calculated in advance in the form of a table or map, as at least some of the calculation results of said calculating means of said speed position control signal outputting means, said data read from said storing means being outputted as said speed control signal.

18. A disk drive according to claim 1, wherein said head position detecting means comprises means for detecting a position of said head and generating a first position signal having a discontinuous point at the boundary between tracks, and means for generating a second position signal representative of a deviation from said target position by connecting said discontinuous point of said first position signal.

19. A disk drive according to claim 3, wherein said head position detecting means comprises means for detecting a position of said head and generating a first position signal having a discontinuous point at the boundary between tracks, and means for generating a second position signal representative of a deviation from said target position by connecting said discontinuous point of said first position signal.

20. A disk drive according to claim 4, wherein said head position detecting means comprises means for detecting a position of said head and generating a first position signal having a discontinuous point at the boundary between tracks, and means for generating a second position signal representative of a deviation from said target position by connecting said discontinuous point of said first position signal.

21. A method of controlling a disk drive, comprising the steps of:
reading information of a position of a target track;
reading a position detection signal representative of a position of a head and detected by a position detector;
calculating a target acceleration signal in accordance with said information and position detection signal so as to make a turnaround frequency of a frequency component of said target acceleration signal coincident with a resonance frequency of a head positioning mechanism;

calculating a target position signal for a head positioning operation by integrating twice said target acceleration signal;

calculating a position command value by inputting said target position signal to a model (inverse model) of an approximate inverse system to a position control system which includes said head positioning mechanism and said position detector;

outputting a position tracking error signal to said positioning mechanism, said position tracking error signal being a difference between said position command value and said position detection signal of said head; and moving said head by said positioning mechanism in response to said position tracking error signal.

* * * * *